June 12, 1962  A. L. LEE ET AL  3,038,564

COOLED BRAKE

Filed Dec. 31, 1957  3 Sheets-Sheet 1

INVENTORS.
ARTHUR L. LEE
ARTHUR B. COVAL
BY Stanley J Price

THEIR ATTORNEY

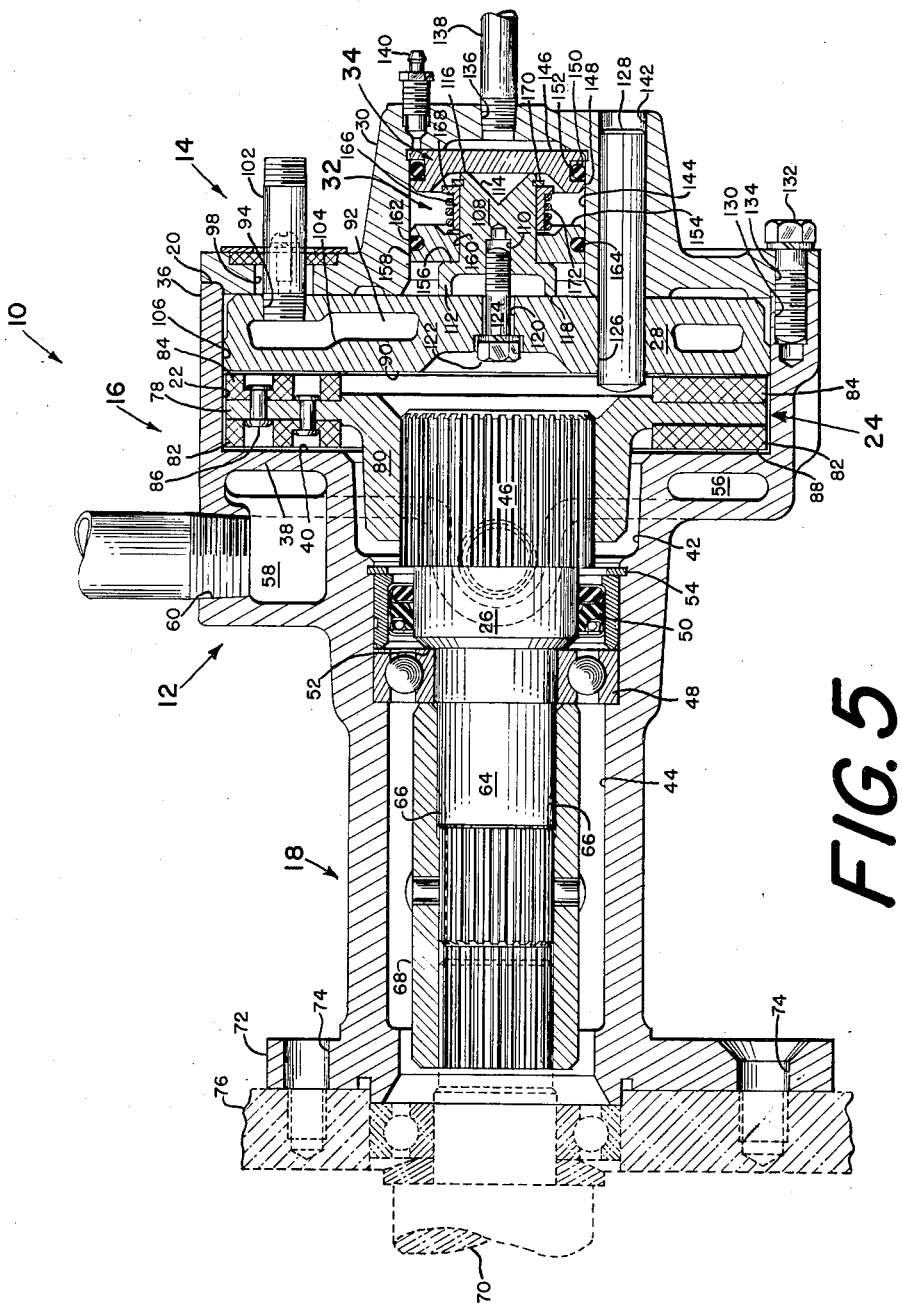

INVENTORS.
ARTHUR L. LEE
ARTHUR B. COVAL
BY
THEIR ATTORNEY

United States Patent Office 3,038,564
Patented June 12, 1962

3,038,564
COOLED BRAKE
Arthur L. Lee and Arthur B. Coval, Columbus, Ohio, assignors to Consolidation Coal Company, Pittsburgh, Pa., a corporation of Pennsylvania
Filed Dec. 31, 1957, Ser. No. 706,481
1 Claim. (Cl. 188—264)

This invention relates to a cooled brake and more particularly to a liquid cooled brake.

As the size and speed of haulage vehicles and other power driven mechanisms increase the problem of dissipating the heat generated by the brakes increases proportionately. Where the means to dissipate the heat is inadequate, damage to the braking mechanism such as warping and undue slippage results. We have discovered that the heat generated in braking is more efficiently dissipated where both the pressure plate and the brake housing are separately cooled by means of a circulating liquid. With our construction the pressure plate has an annular wall that is adapted to exert a frictional braking force against the lining of the brake disc. The other side of this annular wall is in direct heat exchange relationship with the cooling liquid. When the brake is applied, the heat of friction generated between the pressure plate and the brake lining is rapidly transferred through the pressure plate annular wall to the cooling liquid. Similarly the brake housing has an annular wall which serves as a braking surface for the other side of the brake disc. The housing annular wall is in heat exchange relation with the cooling liquid on the other side. Thus the heat of friction generated by the brake linings on both of the annular walls is quickly transferred through the annular walls and is removed by means of the cooling liquid.

In addition to the cooling features our brake includes the minimum metal to metal contact between the pressure plate and the brake actuator mechanism. This feature minimizes the possibility of the hydraulic fluid used in actuating the brake from vaporizing due to excess heat and reducing the efficiency of the brake.

Accordingly, it is the principal object of this invention to provide a liquid cooled brake that has a cooling means in both the pressure plate and the housing.

Another object of our invention is to provide a liquid cooled brake wherein the metal surfaces adjacent the friction members are also in contact with the cooling liquid to thereby maintain the friction members as cool as possible.

A further object of our invention is to provide the minimum metal to metal contact between the brake actuating means and the pressure plate.

A still further object of our invention is to provide a braking mechanism wherein the brake actuating means may be quickly disassembled and the friction plates quickly replaced.

Another object is to provide a liquid cooled brake that is simple in construction, built at minimum cost and having high braking efficiency.

These and other objects will be more completely disclosed and described in the following specification, the accompanying drawings and the appended claim.

In the accompanying drawings there is clearly and fully illustrated one embodiment of this invention, in which figures:

FIGURE 5 is a developed section taken along the line 5—5 of FIGURE 4 and illustrating the brake in its disengaged position.

Figure 2:
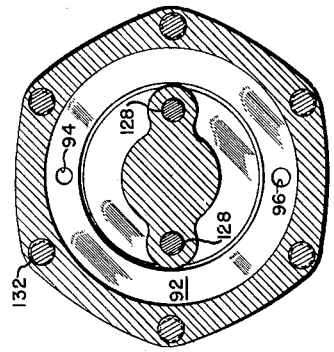
FIGURE 2 is a view in section taken along the line 2—2 of FIGURE 1 and illustrating the annular recess in the pressure plate.
Figure 1:
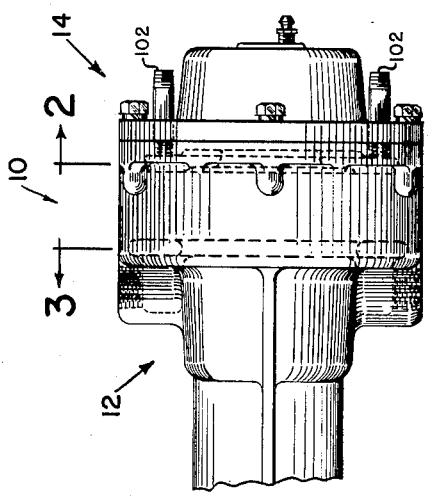
FIGURE 1 is a view of the brake assembly in side elevation.
Figure 4:
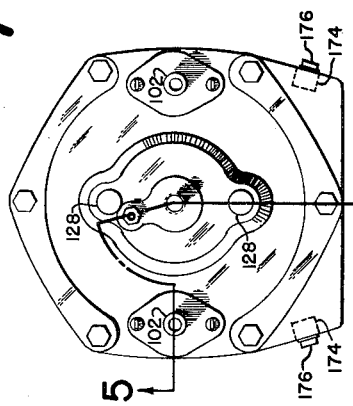
FIGURE 4 is a view of the brake assembly in end elevation.
Figure 6:
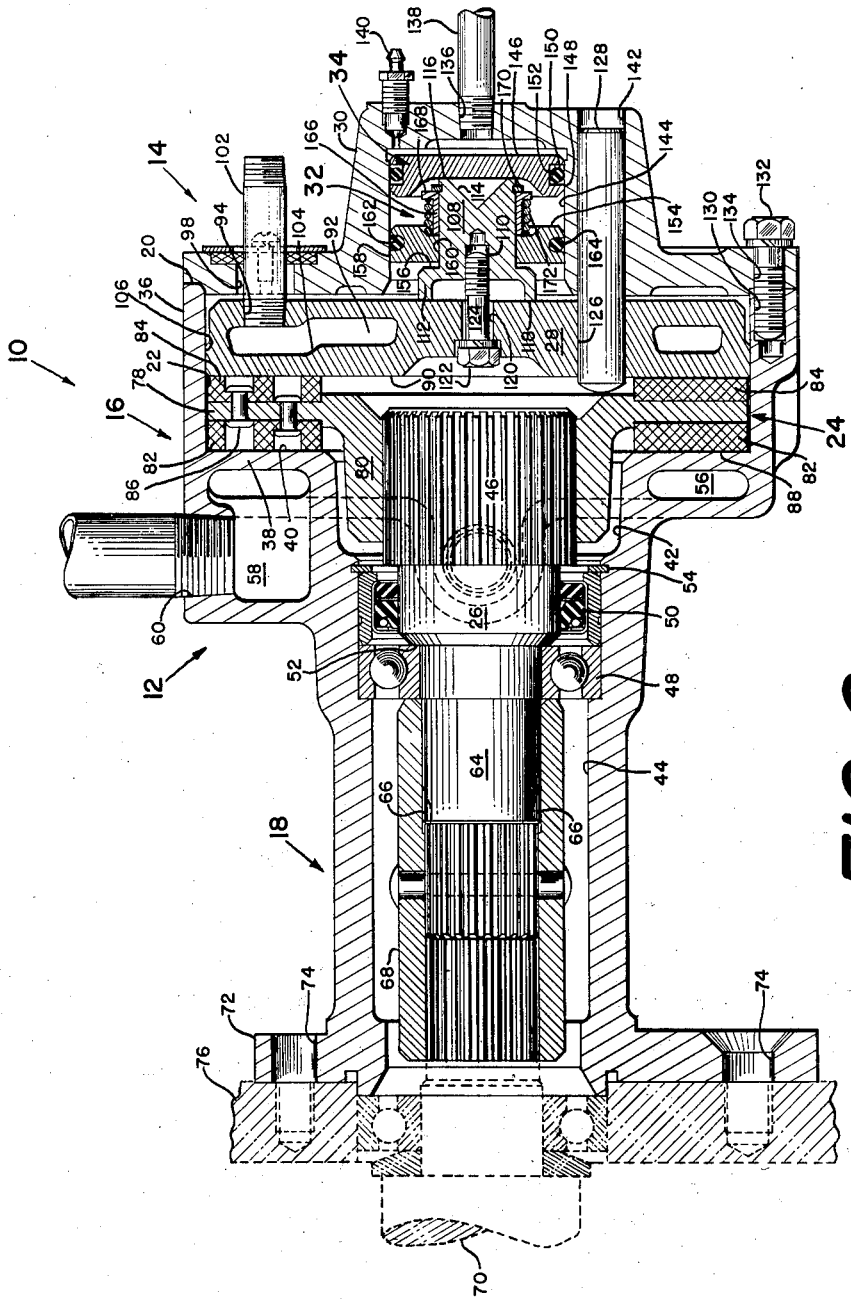
FIGURE 6 is a view similar to FIGURE 5 and illustrating the brake in the engaged position.

Referring to the drawings and particularly to FIGURES 1, 5 and 6 there is illustrated our brake assembly generally designated by the numeral 10. The brake assembly 10 has two major external portions, the housing 12 and the end plate 14. The housing 12 is cylindrical in shape and has a body portion 16 and a cylindrical sleeve portion 18 extending rearwardly therefrom. The housing body portion 16 has an open end 20 which is closed by the end plate 14 to form a totally enclosed brake assembly that is packaged against dust and dirt.

The housing body portion 16 has an internal cavity 22 (FIGURES 5 and 6) in which there is positioned an annular brake disc 24. The brake disc 24 is arranged coaxially on a shaft 26 that has one end in the housing body portion cavity 22 and the other end extending into the housing sleeve 18. Also positioned in the housing cavity 22 is a pressure plate 28 which is arranged to move axially within the cavity 22 to frictionally engage the brake disc 24.

The end plate 14 has a cup shaped central portion 30 which forms an internal central cavity 32. The brake actuating means generally designated by the numeral 34 is positioned within the cavity 32 and is operable to move the pressure plate 28 axially in the cavity 22 to frictionally engage the brake disc 24.

The detailed construction of the various parts of the brake assembly 10 is illustrated in FIGURES 5 and 6. The housing cylindrical body portion 16 has a cylindrical wall 36 that terminates in the housing open end 20. The housing cavity 22 has an annular inwardly extending wall 38 which is integrally formed with the cylindrical wall 36. The annular wall 38 has an outer annular surface 40 that is adapted to serve as a metal friction surface for the brake mechanism. The housing annular wall 38 has an enlarged central passageway 42 which is coaxial with and forms a part of a longitudinal passageway 44 in the housing sleeve portion 18. The shaft 26 extends through the sleeve passageway 44 and has an externally splined end portion 46 extending into the enlarged central passageway 42 of the housing body portion 16. Roller bearings 48 are carried in the sleeve passageway 44 and rotatably support the shaft 26. Annular sealing means 50 extend around the shaft 26 adjacent the bearings 48 and serve as a closure means between the sleeve passageway 44 and the housing passageway 42. The shaft 26 has a shoulder portion 52 that abuts the bearings 48. This shoulder portion 52 limits axial movement of the shaft 26 in the sleeve passageway 44. An annular snap ring 54 maintains the bearings 48 and sealing means 50 in a fixed position in the sleeve passageway 44.

Figure 3:
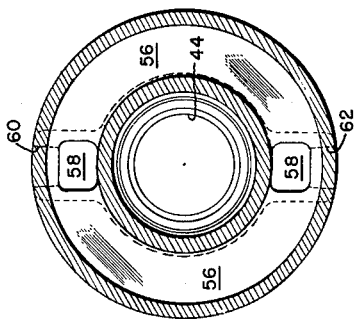
FIGURE 3 is a view in section taken along the line 3—3 of FIGURE 1 and illustrating the annular recess in the brake housing.

The housing body portion 16 has an annular passageway 56 formed therein. The annular passageway 56 is shown in section in FIGURE 3 and has a pair of rearwardly offset chambers 58. The chambers 58 have radial openings 60 and 62 which are arranged to receive inlet and outlet conduits that convey cooling liquid through the annular passageway 52. It should be noted that the housing annular wall 38 is also a wall of the passageway 56. The annular wall 38, as previously stated, has an outer surface 40 that serves as a friction surface for the brake mechanism. The fluid in the passageway 56 is in direct heat exchange relation with the one side of the wall 38 and the other side of the wall 38 is in direct heat exchange relation with the brake disc 24. Thus the wall 38 is arranged to be in frictional arrangement with the brake disc 24 on one side and in heat exchange relation with the cooling liquid on the other side.

The shaft 26 has an enlarged externally splined end portion 46 positioned within the housing passageway 42. The other end portion 64 extends into the sleeve passageway 44 and has a pair of keyed slots 66 that are illustrated in dotted lines in FIGURES 5 and 6. An internally splined sleeve 68 is keyed at one end to the shaft 26 and is arranged to couple the shaft 26 to a driven shaft 70 indicated in dotted lines. The housing sleeve 18 has a radially flanged end portion 72. Apertures 74 extend through the flange 72 and are arranged to secure the brake housing 12 to a fixed portion of the vehicle as indicated in dotted lines at 76. Thus the housing 12 is rigidly secured to the vehicle and the shaft 26 is secured to and rotatable with the driven shaft 70. The brake disc 24 is thus arranged to control the rotation of driven shaft 70 and in turn regulate vehicle movement.

The brake disc 24 has an annular plate 78 with a rearwardly offset internally splined hub portion 80. The hub portion 80 is splined on the externally splined end portion 46 of shaft 26. The plate hub 80 is so arranged on the splined end portion 46 so that it is axially movable thereon but nonrotatable relative thereto. This arrangement permits the pressure plate 28 to move the brake disc 24 against the housing wall 38 upon brake actuation. A pair of annular friction members 82 and 84 are secured to opposite sides of the plate 78 by means of rivets 86. The friction disc 82 has an outer surface 88 that, upon brake actuation, moves into frictional engagement with the housing annular wall outer surface 40. The annular friction member 84, upon brake actuation, is frictionally engaged by the pressure plate end wall 90.

The pressure plate 28 has an annular passageway 92 therein with a pair of lateral openings 94 and 96. Since FIGURES 5 and 6 are developed sections only the lateral opening 94 is illustrated. The lateral openings 94 and 96 are arranged in axial alignment with apertures 98 and 100 in end plate 14. Nipples 102 are secured in the apertures 94 and 96 and extend through respective apertures 98 and 100 and are arranged to convey cooling liquid therethrough. It should be noted that a side wall 104 of passageway 92 is in heat exchange relation with both the liquid in passageway 92 and with the friction disc 84. The pressure plate 28 has an outer circumferential wall 106 that abuts the inner surface of the housing cylindrical wall 36.

The pressure plate 28 has a cylindrical hub portion 108 that has a central threaded passageway 110 therein. The hub 108 has an annular flange portion 112 extending outwardly from one end. The other end of the hub portion 108 has an internal conical cavity 114 which forms an annular edge portion 116. The hub annular flange portion 112 terminates in an annular edge portion 118. The pressure plate 28 has a central aperture 120 and a bolt 122 extends therethrough. The diameter of the aperture 120 is greater than the diameter of the bolt body portion 124 so that when properly positioned the bolt body portion 124 is in spaced relation with the cylindrical wall of apertures 120. The bolt 122 is arranged to threadedly secure the hub 108 to the pressure plate 28 with the annular edge 118 of hub 108 abutting the rear wall of pressure plate 28. The pressure plate 28 also has a plurality of dowel apertures 126 therethrough which receive dowel pins 128 as later explained.

The housing cylindrical wall 36 has a plurality of longitudinal threaded apertures 130 and the end plate 14 has a plurality of mating circumferential apertures 134 which are axially aligned with apertures 130 in the brake housing cylindrical wall 36. The end plate 14 is dettachably secured to the brake housing 12 by means of the bolts 132 extending through aligned apertures 130 and 134.

The end plate hub portion 30 has a central threaded aperture 136 extending longitudinally therethrough which receives conduit 138. The conduit 138 is arranged to supply pressurized fluid to the hub portion cavity 32. A lubricating fitting 140 is also provided to supply lubricant to the inner cavity 32. The hub portion 30 also has a plurality of dowel passageways 142 extending longitudinally therethrough in axial alignment with the respective dowel apertures 126 in pressure plate 28. The passageways 142 and apertures 126 receive dowel members 128 that maintain the pressure plate 28 in nonrotatable relation relative to the end plate 14 and the brake housing 12. The pressure plate 28, however, is movable axially relative to the end plate 14.

The end plate hub 30 has an inner cylindrical wall 144 that serves as the cylindrical wall for the pressure actuating means 34. Positioned within the hub cavity 32 is the pressure actuating means 34 which includes a dish shaped piston 146 having a circumferential wall 148. The piston 146 is movable axially within the hub cavity 32 with its circumferential wall 148 abutting the cylindrical wall 144. The piston circumferential wall 148 has an annular recess 150 that receives an O-ring 152 therein. The O-ring 152 limits passage of the pressurized fluid around the piston 146. The piston 146 abuts the annular edge 116 of hub 108. As pressurized fluid enters the cavity 32 through conduit 138 the pressurized fluid exerts an axial force on piston 146 which through its connection to hub 108 exerts a force on pressure plate 28 to move the pressure plate axially into frictional engagement with the disc brake 24.

An annular wear compensating member 154 is positioned on the cylindrical hub 106 adjacent the shoulder 156 formed by the hub annular flange portion 112. The wear compensating member has an outer circumferential wall 158 that is in sliding relation with the hub portion inner cylindrical wall 144. The inner circumferential wall 160 of the wear compensator member 154 is slidable relative to the hub 108. The wear compensator outer circumferential wall 158 has an annular groove 162 therein. Positioned in the annular groove 162 is an O-ring 164 which is of such dimension that it maintains the wear compensating member 154 in frictional engagement with the cylindrical wall 144. The O-ring 164 is so constructed that a force of between 40 and 60 pounds is required to move the wear compensating member 154 axially relative to the end plate hub cylindrical wall 144. The pressure plate hub 108 is freely movable relative to the wear compensator 154. The pressure plate hub 108 has a sleeve member 166 positioned thereon between the piston 146 and the wear compensator 154. The sleeve 166 has an outward radial flange 168 adjacent one end. Rearward axial movement of sleeve 166 is limited by the snap ring 170 that is secured in an annular groove in hub 108. A helical spring 172 is positioned around the sleeve 166 and abuts the sleeve flange 168 at one end. The other end of the spring 172 abuts a wall of the wear compensator 154. Spring 172 is compressed against the wear compensator 148 as pressurized fluid entering through conduit 138 moves piston 146 toward the pressure plate 28. When the fluid pressure is relieved the spring 172 expands against the compensator 154 and moves the piston 146 in a direction away from the pressure plate 28. The O-ring 164 has frictional force that retains the compensator 154 in a fixed position so that the compensator may serve as a backing means for the spring 172.

The housing 12 has a pair of radial apertures 174 which extend into the cavity 22. Plug members 176 close the apertures 174. The wear of the friction members 82 and 84 may be visually checked by removal of plugs 176.

As has been previously described, when the pressure plate 28 is moved axially toward the brake disc 24, the brake 24 is moved axially on the shaft splined end portion 46 until the surface 88 of the friction member 82 abuts the surface 40 of housing wall 38. Subsequent movement of pressure plate 28 brings the pressure plate end wall 90 into abutting relation with the outer surface of frictional member 84. In this manner frictional force is exerted on the rotating brake disc 24 to regulate the speed of rotation of shaft 70. The heat of friction generated as the friction member 82 is moved into abutting relation with the stationary housing wall 38 is transferred through the housing wall 38 to the liquid within passageway 56. The housing wall 38, having a high coefficient of heat transfer, readily transfers the heat generated through the wall to the fluid in passageway 56. Since fluid is continually circulated through passageway 56 the heat transferred through the wall 38 is quickly removed from the brake 10 and dissipated elsewhere.

Similarly the pressure plate end wall 90, as it is moved into frictional engagement with the friction members 84, absorbs the heat of friction generated. This heat is transferred through the end wall 90 to fluid within the pressure plate passageway 92. Fluid is continually circulated through the passageway 92 and the heat is removed from the pressure plate 28 and the brake 10. With this arrangement assuming the fluid is being circulated at a predetermined rate through passageways 56 and 92 the temperature of the friction members 82 and 84 is maintained at substantially the same temperature as the housing wall 38 and the pressure plate wall 90. Since the opposite sides of the walls 38 and 90 are continually cooled by the circulating fluid, the walls 38 and 90 are maintained below a predetermined safe temperature. The above described construction results in the annular plate 78 being maintained at substantially the same temperature of the end walls 38 and 90 and since the walls 38 and 90 are contionually cooled by circulating fluid it follows that the metallic annular plate 78 will not be exposed to excessive heat that results in undesirable warping.

The pressure plate hub 108 is so constructed that there is a minimum area of metallic contact between the hub 108 and the pressure plate 28 and also between the hub 108 and the piston 146. This reduced area of metallic contact between the pressure plate 28 and the piston 146 reduces the rate of heat exchange therebetween. This prevent sthe pressurized fluidf rom exceeding its vaporization temperature and assures positive braking.

Upon release of the pressurized fluid behind piston 146 the piston 146, due to the pressure of spring 172, moves away from the brake disc 24. Concurrent with movement of piston 146 the hub 108 and pressure plate 28 move away from brake disc 24. Centrifugal force of the rotating brake disc 24 moves the disc brake hub 80 on the shaft splined end 46 until the brake disc 24 is intermediately positioned between the hub wall 38 and pressure plate wall 90. In its disengaged position (FIGURE 5) the brake disc 24 has a clearance between the walls 38 and 90 so that it is air lubricated by means of air between the friction members 82 and 84 and the respective walls 38 and 90.

According to the provisions of the patent statutes, we have explained the principle, preferred construction, and mode of operation of our invention and have illustrated and described what we now consider to represent its best embodiment. However we desire to have it understood that, within the scope of the appended claim, the invention may be practiced otherwise than as specifically illustrated and described.

We claim:

A liquid cooled brake comprising a stationary cylindrical housing having a body portion with a sleeve portion of reduced diameter extending from one end and forming an annular vertical wall therebetween, said body portion having an open other end portion, an end plate enclosing said body portion open end portion and forming an enclosed cavity within said housing, said end plate having a cup shaped central portion axially aligned with said sleeve portion, a pressure plate positioned entirely within said cylindrical housing in non-rotatable relation to said housing and axially movable relative thereto, a shaft journaled within said sleeve portion, said shaft having one end extending into said housing cavity and terminating at an axially spaced distance from said pressure plate, said cylindrical housing and said shaft being in rotatable, axially fixed relation to each other, an annular brake disc positioned in said cavity and nonrotatably secured to said shaft end portion through an axially extending hub portion on said brake disc so that said brake disc is positioned axially between said housing annular vertical end wall and said pressure plate, said annular brake disc being movable axially on said shaft, a cylindrical pressure plate hub having a length at least as great as its maximum diameter positioned in said end plate cup portion and having one annular end portion and a thin-walled, cup shaped other end portion, said hub cup shaped other end portion abutting said pressure plate in an annular area of contact, means securing said pressure plate hub to said pressure plate, a piston having a full circular fluid engaging face positioned in said end plate cup portion opposite said housing sleeve portion with the axis of said piston being axially aligned with said shaft, said piston abutting said pressure plate hub annular end portion in substantially circular line contact, said hub annular end portion and said hub cup shaped other end portion contacting said piston and said pressure plate respectively over surface areas located entirely radially inwardly of the inside diameter of said brake disc to reduce potential heat transfer from said pressure plate to said piston, and fluid pressure means to move said piston axially in said end plate cup portion to thereby move said pressure plate and said brake disc toward said housing vertical wall, said pressure plate having an annular passageway therein, a fluid conduit extending axially through said end plate and communicating with said annular passageway, and said housing vertical wall having a second annular passageway therein, both of said passageways arranged to have cooling liquid circulated therethrough to thereby cool said respective pressure plate and said housing.

References Cited in the file of this patent

UNITED STATES PATENTS

| | | |
|---|---|---|
| 799,691 | Sturtevant | Sept. 19, 1905 |
| 1,972,353 | North et al. | Sept. 4, 1934 |
| 2,082,633 | Johnstone | June 1, 1937 |
| 2,127,557 | Ells | Aug. 23, 1938 |
| 2,174,635 | Linderman | Oct. 3, 1939 |
| 2,664,176 | Whalen | Dec. 29, 1953 |
| 2,684,742 | Eason | July 27, 1954 |
| 2,710,078 | Cardweil | June 7, 1955 |
| 2,746,254 | Lucien | May 22, 1956 |
| 2,747,702 | Van Zelm | May 29, 1956 |
| 2,778,451 | Friedman | Jan. 22, 1957 |
| 2,817,419 | Wolf | Dec. 24, 1957 |
| 2,821,271 | Sanford | Jan. 28, 1958 |
| 2,915,146 | Lee et al. | Dec. 1, 1959 |